US011767813B2

(12) United States Patent
Masti

(10) Patent No.: US 11,767,813 B2
(45) Date of Patent: Sep. 26, 2023

(54) NOISE ATTENUATING FUEL TRAP FOR EVAPORATIVE EMISSION CONTROL CANISTER SYSTEM

(71) Applicant: DELPHI TECHNOLOGIES IP LIMITED, St. Michael (BB)

(72) Inventor: Ravish S. Masti, Bangalore (IN)

(73) Assignee: Delphi Technologies IP Limited, St. Michael (BB)

( * ) Notice: Subject to any disclaimer, the term of this patent is extended or adjusted under 35 U.S.C. 154(b) by 0 days.

(21) Appl. No.: 17/570,970

(22) Filed: Jan. 7, 2022

(65) Prior Publication Data

US 2023/0220820 A1  Jul. 13, 2023

(51) Int. Cl.
*F02M 25/08* (2006.01)
*B01D 53/04* (2006.01)
*B01D 45/08* (2006.01)

(52) U.S. Cl.
CPC ......... *F02M 25/0854* (2013.01); *B01D 45/08* (2013.01); *B01D 53/0415* (2013.01); *B01D 53/0446* (2013.01); *B01D 2253/102* (2013.01); *B01D 2259/40086* (2013.01); *B01D 2259/4516* (2013.01)

(58) Field of Classification Search
CPC .................... F02M 25/0854; B01D 2259/4516
See application file for complete search history.

(56) References Cited

U.S. PATENT DOCUMENTS

| | | | | |
|---|---|---|---|---|
| 3,856,485 A * | 12/1974 | Mansell | .................... | F01N 3/00 95/92 |
| 10,589,621 B1 * | 3/2020 | McKoskey | ............ | B62K 19/30 |
| 2007/0056264 A1 * | 3/2007 | Hou | ........................ | F01N 9/005 60/274 |
| 2008/0223865 A1 | 9/2008 | Althof et al. | | |

(Continued)

FOREIGN PATENT DOCUMENTS

| EP | 2794324 B1 | 11/2015 |
|---|---|---|
| EP | 2951474 B1 | 3/2021 |

OTHER PUBLICATIONS

Chang, J. et al., "Analysis and Optimization of Idle Noise Caused by Canister Purge Solenoid Valve" E3S Web of Conferences. vol. 268. EDP Sciences, 2021.

*Primary Examiner* — John Kwon
(74) *Attorney, Agent, or Firm* — Warner Norcross + Judd LLP

(57) ABSTRACT

A fuel vapor storage canister including an integral fuel trap is provided. The fuel trap includes bifurcated chambers with the dual purpose of trapping liquid trace and attenuating noise entering the canister shell and tank line. The upper chamber includes a baffle to block and collect liquid trace, the liquid trace falling through an opening in a partition for collection in a fuel trace collector. The fuel trace collector is suitably positioned within the lower chamber, immediately beneath the opening, and includes a cavity and a venturi. The venturi creates a region of low pressure during purging, which evacuates the cavity by suction. The cavity optionally includes an activated carbon billet, which maintains the (Continued)

pressure level in the fuel vapor line above a predetermined minimum value and which aids in converting the liquid trace to fuel vapor as well as in further attenuating noise escaping into the tank line.

17 Claims, 7 Drawing Sheets

(56) References Cited

U.S. PATENT DOCUMENTS

| | | | | |
|---|---|---|---|---|
| 2012/0209498 A1* | 8/2012 | Aoki | ................... | F02D 41/1454 |
| | | | | 701/103 |
| 2015/0345517 A1* | 12/2015 | Fletcher | ................... | F04F 5/16 |
| | | | | 417/65 |

* cited by examiner

NOISE ATTENUATING FUEL TRAP FOR EVAPORATIVE EMISSION CONTROL CANISTER SYSTEM

FIELD OF THE INVENTION

The present invention relates to evaporative emission control systems, and in particular, systems for reducing the contamination of the activated carbon in the canister shell by the liquid fuel traces suspended in the fuel vapor emissions from the vehicle fuel tanks; and systems for reducing the noise generated during the purge valve operation of the canister system.

BACKGROUND OF THE INVENTION

Modern vehicles include an evaporative emissions control system (EVAP) canister to store fuel vapor from the fuel tank. In its most basic configuration, the EVAP canister includes activated carbon, a tank port in communication with the fuel tank, a purge port in communication with a purge valve, and an air inlet port. The activated carbon adsorbs fuel vapor from the fuel tank until the EVAP canister is purged, at which time fresh air is drawn through the EVAP canister via the air inlet port. In particular, when a downstream purge valve is open, the purged fuel vapor is drawn into an intake manifold to mix with intake air for combustion in the vehicle's engine.

The activated carbon is an important component of the EVAP canister. An efficiently performing activated carbon results in a more compact EVAP canister with improved fuel vapor adsorption and desorption (during purging operations) capacities, less weight, less cost, and longer service life. However, one of the causes for the decreased performance or degradation of activated carbon is the wetting of activated carbon by any liquid fuel trace entrained in the fuel vapor from the fuel tank. As the liquid fuel trace accumulates in the activated carbon, the liquid fuel trace chokes the activated carbon and reduces the vapor adsorption/desorption capacity of the EVAP canister. Accordingly, existing systems typically include a fuel trap to sequester liquid fuel trace from the fuel vapors as they enter the EVAP canister.

A further disadvantage of existing EVAP canisters is the generation of noise. In particular, EVAP fuel traps are typically exposed to the purge line to facilitate the extraction of liquid fuel trace along with adsorbed fuel vapor during canister purge cycles. However, noise is generated due to the wave disturbances formed in the purge line during the operation of the purge valve, which is typically located near the intake manifold. This purge noise associated wave disturbances can transfer to and excite the fuel trap, the EVAP canister shell, the distribution line, the fill limit vent valve, and the fuel tank. Purge noise can result in excessive vibration and sound wave radiation, which might exceed the specification limits for the vehicle.

Some existing systems incorporate design features in the purge valve or the purge line. For example, some existing systems include a coaxial expansion joint or a resonator along the purge line or use a flexible material for the purge line. However, these solutions are non-optimal by design. Accordingly, there remains a continued need to suppress purge noise generated during purging operations. In addition, there remains a continued need for improved systems that trap liquid fuel trace to minimize choking of the activated carbon within the EVAP canister.

SUMMARY OF THE INVENTION

A fuel vapor storage canister including an integral fuel trap is provided. The fuel trap includes bifurcated upper and lower chambers with the dual purpose of trapping the liquid trace and attenuating the noise entering the canister shell and tank line. The upper chamber includes a baffle to block and collect the liquid trace, the liquid trace falling through an opening in a partition for collection in a fuel trace collector. The fuel trace collector is suitably positioned within the lower chamber, immediately beneath the opening, and includes a cavity and a venturi. The venturi creates a region of low pressure during purging, which evacuates the cavity by suction. The cavity optionally includes a carbon billet, which maintains the pressure level in the fuel vapor line above a predetermined minimum value and which aids in converting the liquid trace to fuel vapor.

In accordance with one embodiment, the baffle is positioned between the tank port and an adsorbent chamber to provide a physical barrier to the liquid fuel trace entrained in the fuel vapor. The baffle can include an upright annular sidewall that at least partially encircles the partition opening. The baffle can additionally include a concave surface opposite of a convex surface. Fuel vapor passes around the baffle, while the liquid trace collects on the concave surface of the baffle and flows into the partition opening by gravity and/or deflects directly into the partition opening.

In accordance with another embodiment, the fuel trace collector defines a cavity for the collection of liquid fuel and defines a venturi to draw the liquid fuel from the cavity. The venturi includes a converging portion, an intermediate portion, and a diverging portion, the intermediate portion being open to the internal cavity for creating a high suction pressure therein during purging of the adsorbent chamber. The fuel trace collector includes a width less than a width of the lower chamber, such that fuel vapor from the adsorbent chamber can bypass the fuel trace collector on either side thereof during purging of the adsorbent chamber. The fuel trace collector can include an activated carbon billet within the internal cavity of the fuel trace collector, the billet occupying substantially all of the internal cavity for storing liquid fuel in its porous internal structure.

In operation, fuel vapor, including liquid fuel trace, enters the liquid fuel trap via the tank port. Fuel vapor bypasses the baffle and passes into the adjacent adsorbent chamber, where it is adsorbed by an activated carbon bed. The liquid fuel trace is blocked by the baffle (or baffles) and is prevented from entering the adsorbent chamber. The liquid fuel trace is then received within the cavity in the fuel trace collector. At the designated time, a powertrain control module (PCM) duty cycles an external purge valve. When the purge valve is ON, fuel vapor is desorbed from the activated carbon bed and fuel trace within the cavity is drawn by a suction pressure through the lower chamber of the fuel trap. The engine's suction pressure also causes air from the atmosphere to be drawn into the canister via an air inlet port, displacing the fuel vapor stored in the activated carbon bed. The fuel vapor and liquid fuel trace flows through the purge line to the engine, where it is combusted. With the purge cycle complete, the purge valve closes and additional fuel vapor from the fuel tank is allowed to flow into the fuel vapor storage canister.

As noted above, pressure pulsations caused by actuation of the purge valve travel along the purge conduit to the fuel vapor storage canister. To suppress these pulsations, the lower chamber includes a larger cross-sectional area than the purge port, such that the lower chamber is functionally an expansion volume. As the pulsations enter this expansion volume, the amplitude of the pulsations is greatly attenuated, thereby limiting the vibrations and acoustic rattle during purging cycles. The pulsations are further attenuated by their transition from the lower chamber to the venturi passages and to the cavity/carbon billet situated in the fuel trace collector. As the pulsations enter the upper chamber via the partition opening, they are again attenuated by a further expansion volume, in that the cross-sectional area of the upper chamber is significantly greater than the cross-sectional area of the partition opening. As the pulsations depart the fuel trap via the tank port, they are greatly attenuated by virtue of having passed two expansion chambers: the lower chamber and the upper chamber and the fuel trace collector. As a consequence, the fuel trap can be optimally designed to cater to the noise characteristics of the fuel vapor storage canister and not depend on external noise reduction devices, which can be neither suitable nor optimal by design.

These and other features and advantages of the present invention will become apparent from the following description of an embodiment of the invention, when viewed in accordance with the accompanying drawings and appended claims.

DETAILED DESCRIPTION OF THE CURRENT EMBODIMENT

The embodiment disclosed herein includes a fuel vapor storage canister with a noise attenuating fuel trap. As set forth below, the noise attenuating fuel trap suppresses purge noise in an EVAP system while also trapping liquid trace that is entrained in fuel vapor from the fuel tank. Part I below outlines the shortcomings of existing EVAP systems, including noise generation and choking of the activated carbon. Part II below outlines the structure of the noise attenuating fuel trap of the current embodiment. Part III below outlines the dual functionality of the noise attenuating fuel trap as suppressing purge noise while also trapping liquid fuel trace for discharge to the engine during purging cycles.

Part I: EVAP System Overview

Figure 1:
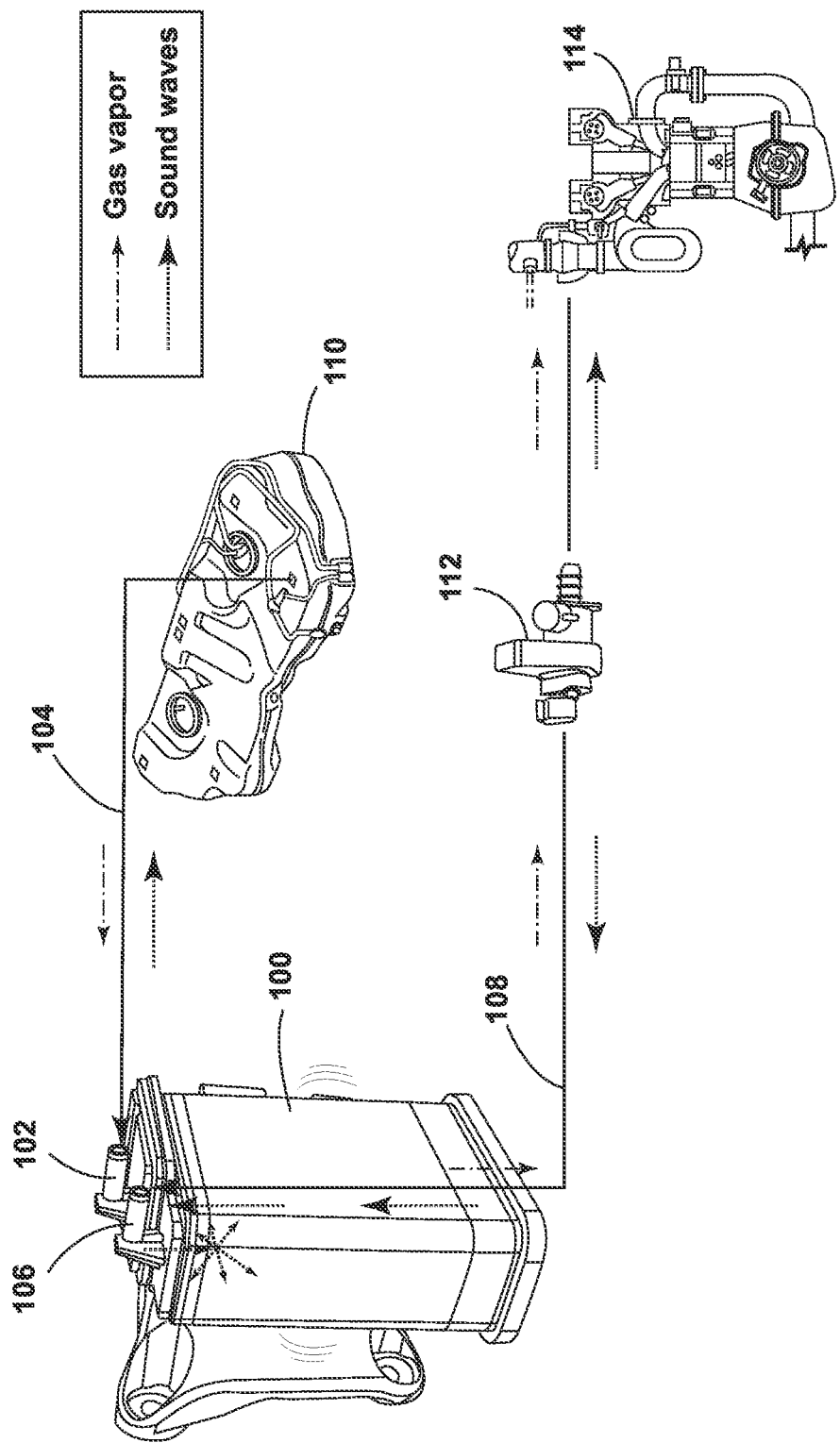
FIG. 1 is a schematic illustration of an evaporative emission control system including a prior art fuel vapor storage canister.

Turning to the drawings, FIG. 1 illustrates an exemplary EVAP system including a prior art EVAP canister 100 containing a bed of activated carbon. The EVAP canister 100 includes a tank port 102 coupled to a fuel vapor line 104 and a purge port 106 coupled to a purge line 108. Fuel vapor including liquid fuel trace vented from a fuel tank 110 flows through the fuel vapor line 104 to the EVAP canister 100. The fuel vapor is adsorbed by the activated carbon, however liquid fuel trace can choke the activated carbon, thereby reducing the adsorption/desorption capacity of the EVAP canister 100. The adsorbed fuel vapor is purged from the activated carbon by activation of a purge valve 112. The desorbed fuel vapor is then mixed with intake air and fed to the engine 114 for combustion. However, the opening and closing of the purge valve 112 creates pressure pulsations in the fuel vapor column. The pressure pulsations travel upstream through the purge line 108 and excite the EVAP canister 100, the fuel vapor line 104, and the fuel tank 110. The pressure pulsations can result in excessive vibration and sound radiation. The embodiment below overcomes these and other limitations with an improved fuel vapor storage canister having an integral fuel trap for trapping liquid fuel trace that is entrained in fuel vapor and for suppressing purge noise generated by actuation of the purge valve 112. The improved fuel vapor storage canister and integral fuel trap of the present invention can be used in lieu of the EVAP canister 100 of FIG. 1, and in combination with other EVAP systems as desired.

Part II: Fuel Trap Structure

Figure 2:
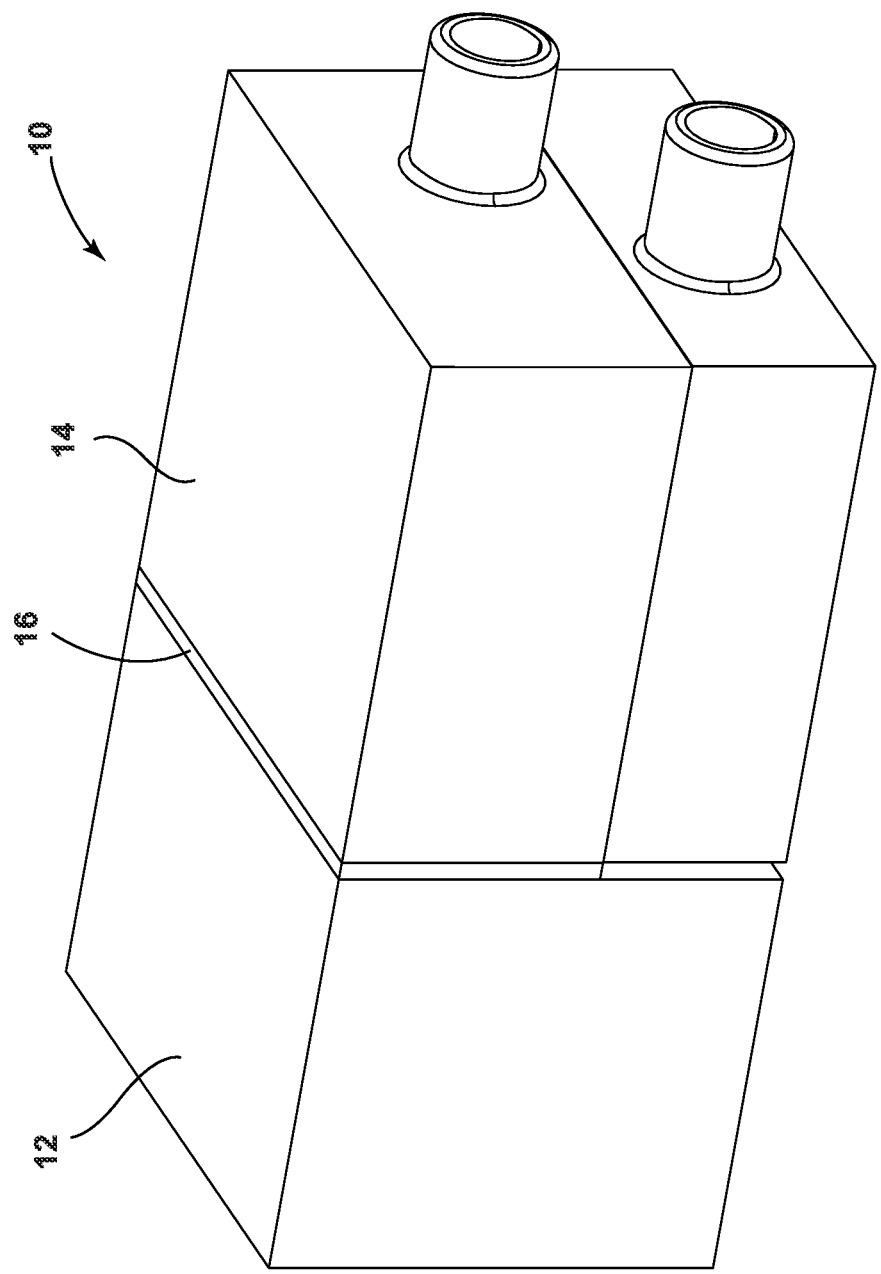
FIG. 2 is a perspective view of a fuel vapor storage canister including a noise attenuating fuel trap in accordance with one embodiment.

Referring now to FIG. 2, the improved fuel vapor storage canister and noise attenuating fuel trap in accordance with one embodiment is illustrated and generally designated 10. The fuel vapor storage canister 10 includes an adsorbent chamber 12 that is adjacent a liquid fuel trap 14. The adsorbent chamber 12 and the liquid fuel trap 14 are self-contained within an outer housing, also referred to as the canister shell, such that the adsorbent chamber 12 and the liquid fuel trap 14 are integral portions of the fuel vapor storage canister 10. The adsorbent chamber 12 contains an adsorbent material, for example a bed of activated carbon, however other adsorbent materials can be used in other embodiments. In addition, the adsorbent chamber 12 is separated from the liquid fuel trap 14 by a distributor 16. As set forth below, the liquid fuel trap 14 serves the dual purpose of trapping liquid trace and attenuating noise entering the canister shell and tank line, while allowing fuel vapor to enter the adsorbent chamber 12 via the distributor 16.

As shown in cross-section in FIG. 3, the liquid fuel trap 14 includes a partition 18 that divides the liquid fuel trap 14 into a first chamber 20 and a second chamber 22, the second chamber 22 being below the first chamber 20. The first chamber 20 is also described herein as an "upper chamber" and the second chamber 22 is also described herein as a "lower chamber," however the upper and lower chambers are not required to be vertically adjacent each other, i.e., the chambers 20, 22 can be laterally offset from each other. The first chamber 20 is open to a tank port 24, and the second chamber 22 is open to a purge port 26. The partition 18 (illustrated as the base of the first chamber 20) defines an opening 28 therethrough, such that the first chamber 20 is in fluid communication with the second chamber 22 through the opening 28 for the collection of liquid fuel trace in a fuel trace collector 30. The opening is optionally surrounded by a sloped surface for funneling liquid fuel into the opening 28.

Figure 3:
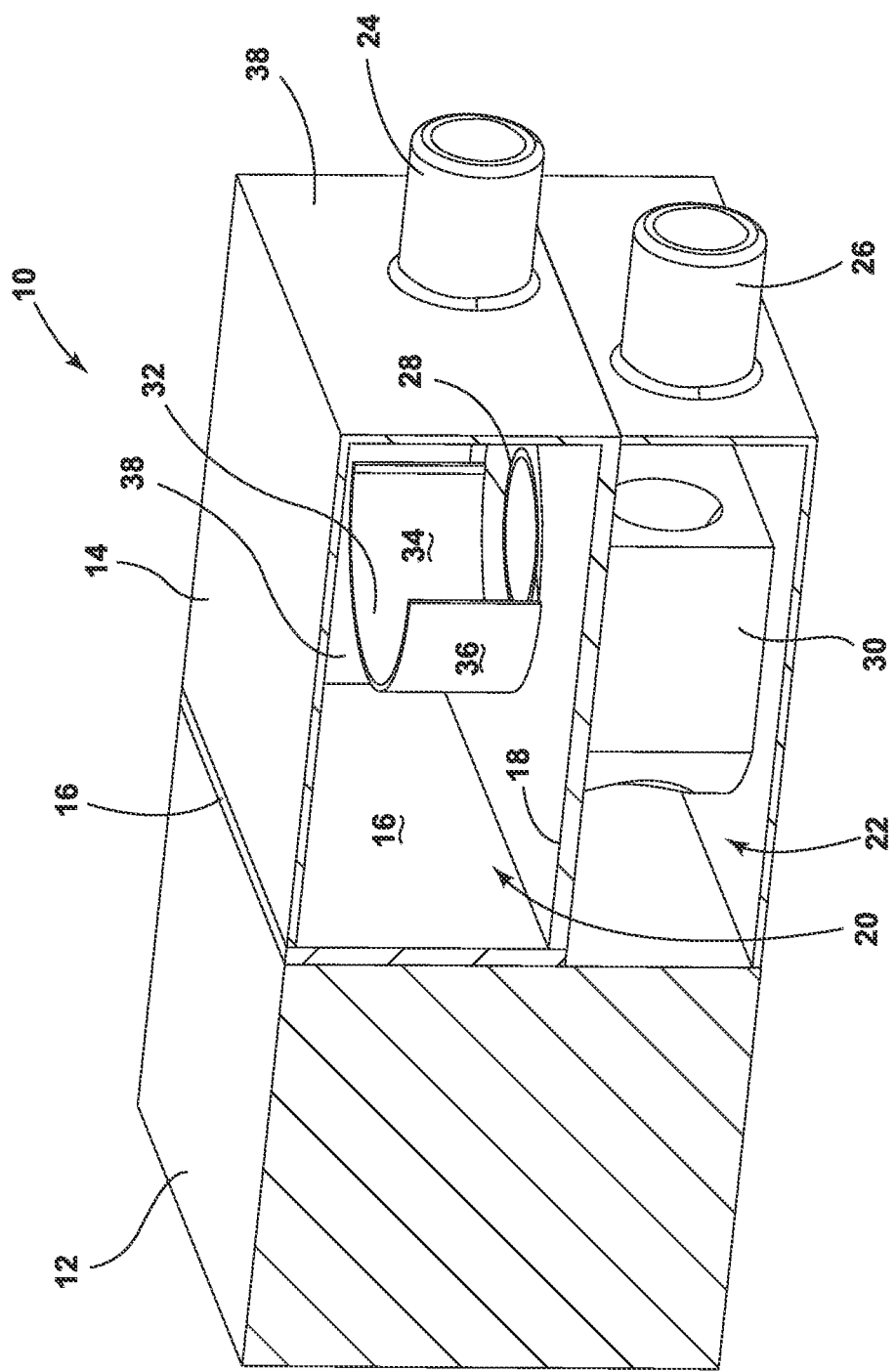
FIG. 3 is a cross-sectional view of the fuel vapor storage canister and the noise attenuating fuel trap of FIG. 2.

As also shown in FIG. 3, the first chamber 20 includes a baffle 32 disposed adjacent to the opening 28 in the partition 18. The baffle 32 functions to block and collect liquid fuel trace entering the first chamber 20 via the tank port 24. In the illustrated embodiment, the baffle 32 includes an annular sidewall that extends upwardly from the partition 18 at least partially encircling a circular opening 28 in the partition 18. More particularly, the baffle 32 includes a semi-circumferential wall having a concave surface 34 opposite a convex surface 36, the semi-circumferential wall extending vertically from the bottom of the first chamber 20, optionally to the top of the first chamber 20. Further, the baffle 32 and the opening 28 are suitably disposed or disposed opposite the tank port 24 within the first chamber 20, being spaced apart from the side walls 38 of the fuel trap 14. In other embodiments however, the baffle and the opening can include other geometries, provided that a forward facing surface 34 of the baffle 32 at least partially obstructs/receives the flow of liquid fuel trace, which is collected through the opening 28 by gravity for collection in fuel trace collector 30.

As noted above, the second chamber 22 is immediately below the first chamber 20 and includes fuel trace collector 30. The fuel trace collector 30 functions to collect liquid fuel trace from the first chamber 20 by gravity, the liquid fuel trace being drawn from the fuel trap 14 during activation of the purge valve 112. In the illustrated embodiment, the fuel trace collector 30 includes a cavity 40 (visible in FIGS. 4 and 5) for the collection of liquid fuel trace, the cavity 40 being open to a venturi 42 defined within the fuel trace collector 30. The cavity 40 (or drain hole) is cylindrically shaped in the illustrated embodiment, but can be shaped differently in other embodiments. As best shown in cross-section in FIG. 5, the venturi 42 extends between a first opening 43 and a second opening 45 in the fuel trace collector 30. The venturi 42 includes a converging portion 44, an intermediate portion 46, and a diverging portion 48. The intermediate portion 46 is open to the cavity 40 via a cross channel 50 for creating a high suction pressure during purging. The cavity 40 includes a base 52 and an annular sidewall 54, the sidewall 54 extending upwardly from the base 52. The cross channel 50 is positioned nearer to the base 52 than to the opening 28, such that liquid fuel trace that accumulates within the cavity 40 can be more easily extracted.

The fuel trace collector 30 defines a width less than a width of the second chamber 22, such that fuel vapor can bypass the fuel trace collector 30 on either side thereof during purging of the adsorbent chamber 12. As shown in FIGS. 4-7, the exterior of the fuel trace collector 30 includes a first end wall 60, a second end wall 62, a first side wall 64, and a second side wall 66. The first opening 43 is defined in the first end wall 60, and the second opening 45 is defined in the second end wall 62, opposite of the first end wall 60. The first end wall 60 is contoured with a convex surface to minimize flow resistance during purging of the adsorbent chamber 12. In particular, the first end wall 60 slopes toward the first and second sidewalls 64, 66 to facilitate the laminar flow of purge gases (air and desorbed fuel vapors) around the fuel trace collector 30 towards the purge port 26 during purge cycles.

Figure 6:
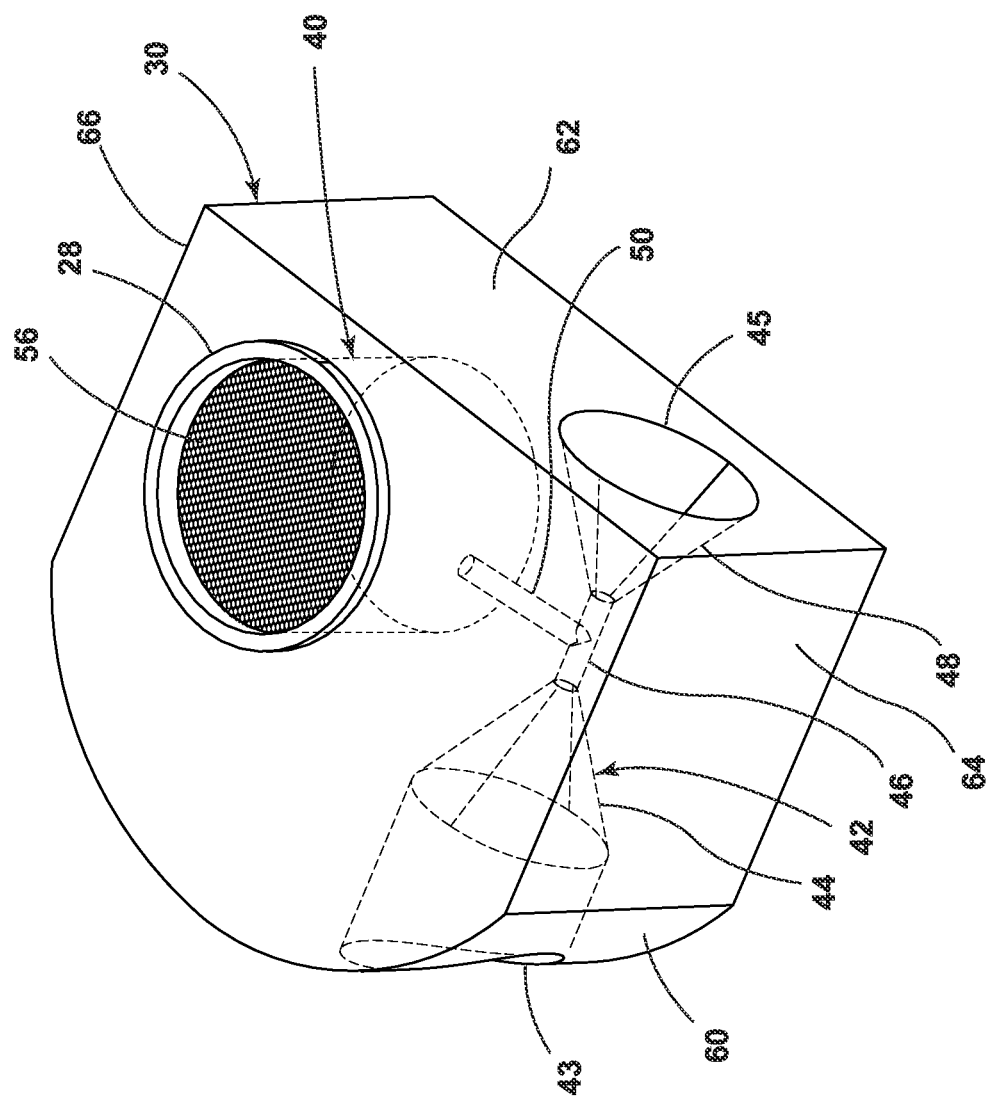
FIG. 6 is a perspective view of a fuel trace collector including an activated carbon billet within the cavity.
Figure 7:
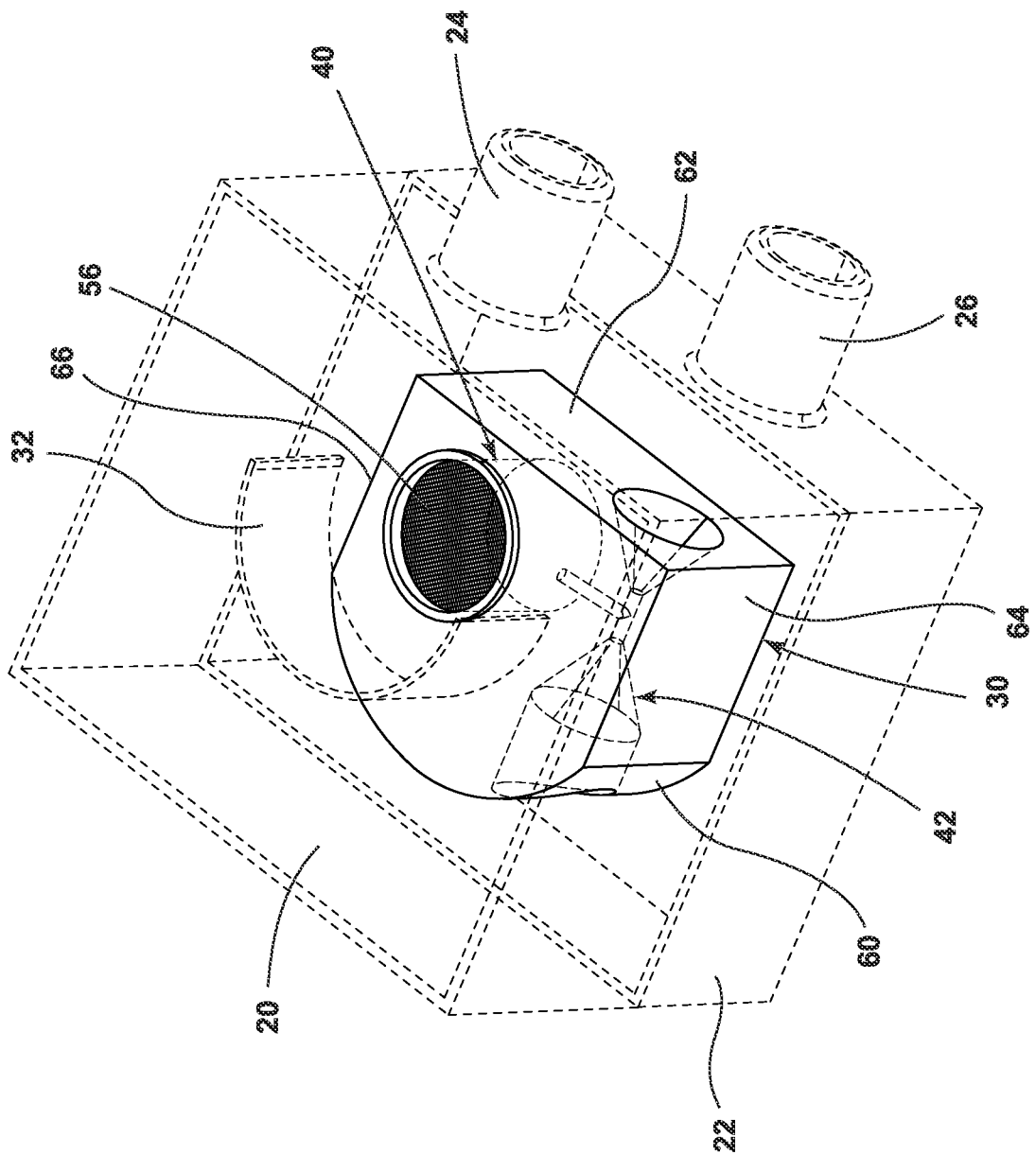
FIG. 7 is a perspective view of the fuel trace collector and the activated carbon billet within the lower chamber of the noise attenuating fuel trap of FIG. 2.

As optionally shown in FIGS. 6 and 7, activated carbon, for example a carbon billet 56, is disposed within the cavity 40. The carbon billet 56 is dimensioned to completely occupy the cavity 40. In the present embodiment, the carbon billet 56 is cylindrically shaped to correspond with the cylindrically shaped cavity 40, however the carbon billet 56 and the cavity 40 can include other configurations in other embodiments. The activated carbon is not limited to a carbon billet however, and in other embodiments the activated carbon can include carbon granules or rolled carbon sheets, for example. The carbon billet 56 maintains the pressure level in the fuel vapor line 104 above a predetermined minimum value. The introduction of the carbon billet 56 also aids in converting the liquid trace to fuel vapor during purging, as the liquid trace occupies/smears across the pores of the carbon billet 56, rather than simply settling to the base of the cavity 40.

To reiterate, the fuel trap 14 includes bifurcated chambers 20, 22 with the dual purpose of trapping liquid trace and attenuating noise entering the canister shell and tank line.

The first (upper) chamber 20 includes a baffle 32 to block and collect liquid trace, the liquid trace falling through an opening 28 in a partition 18 for collection in a fuel trace collector 30. The fuel trace collector 30 is suitably positioned within the second (lower) chamber 22, immediately beneath the opening 28, and includes a cavity 40 and a venturi 42. The venturi 42 creates a region of low pressure during purging, which evacuates the cavity 40 by suction. The cavity 40 optionally includes a carbon billet 56, which maintains the pressure level in the fuel vapor line 104 above a predetermined minimum value and which aids in converting the liquid trace to fuel vapor.

Part III: Fuel Trap Operation

Figure 4:
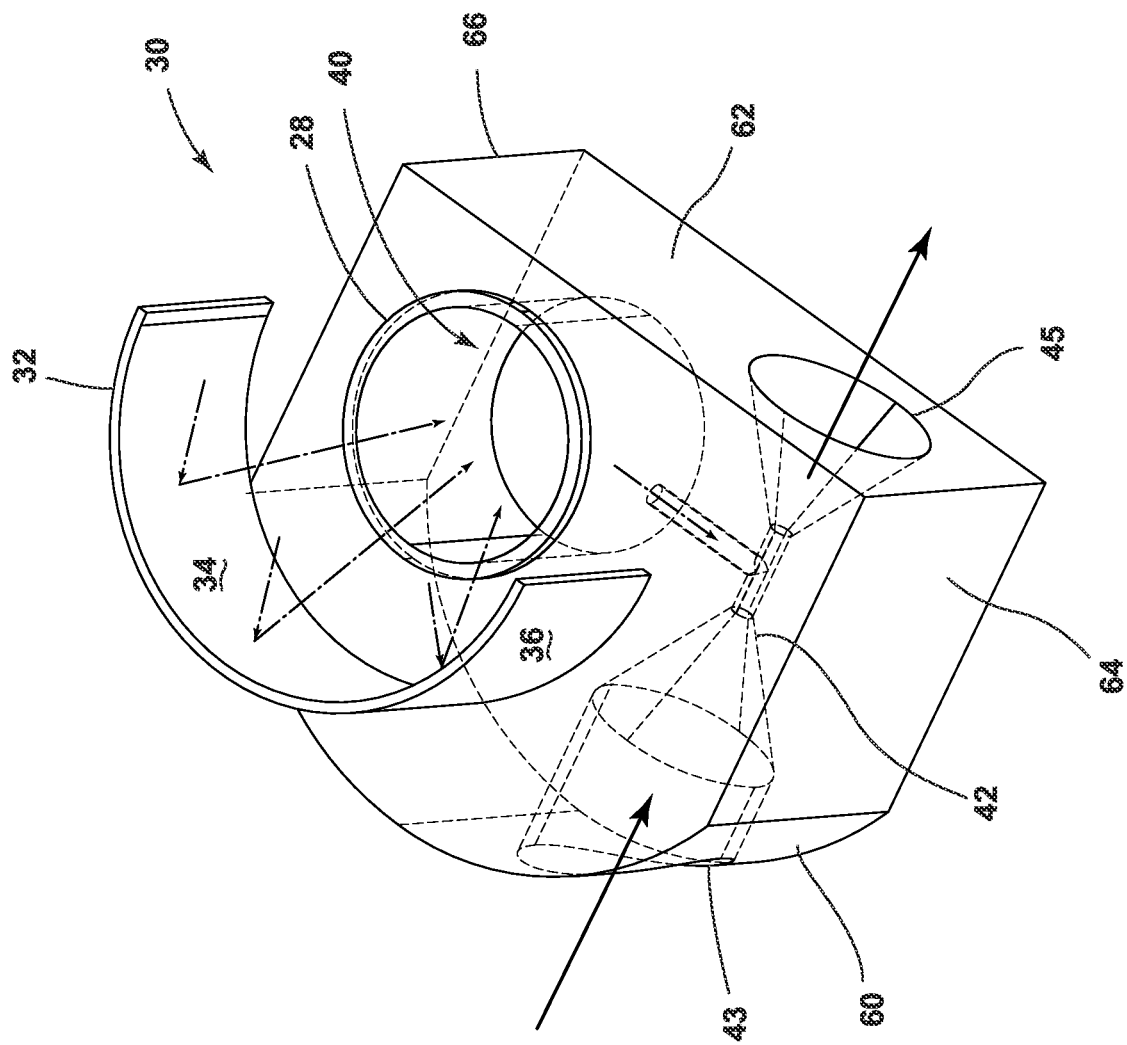
FIG. 4 is a perspective view of a baffle and a fuel trace collector for the noise attenuating fuel trap of FIG. 3.
Figure 5:
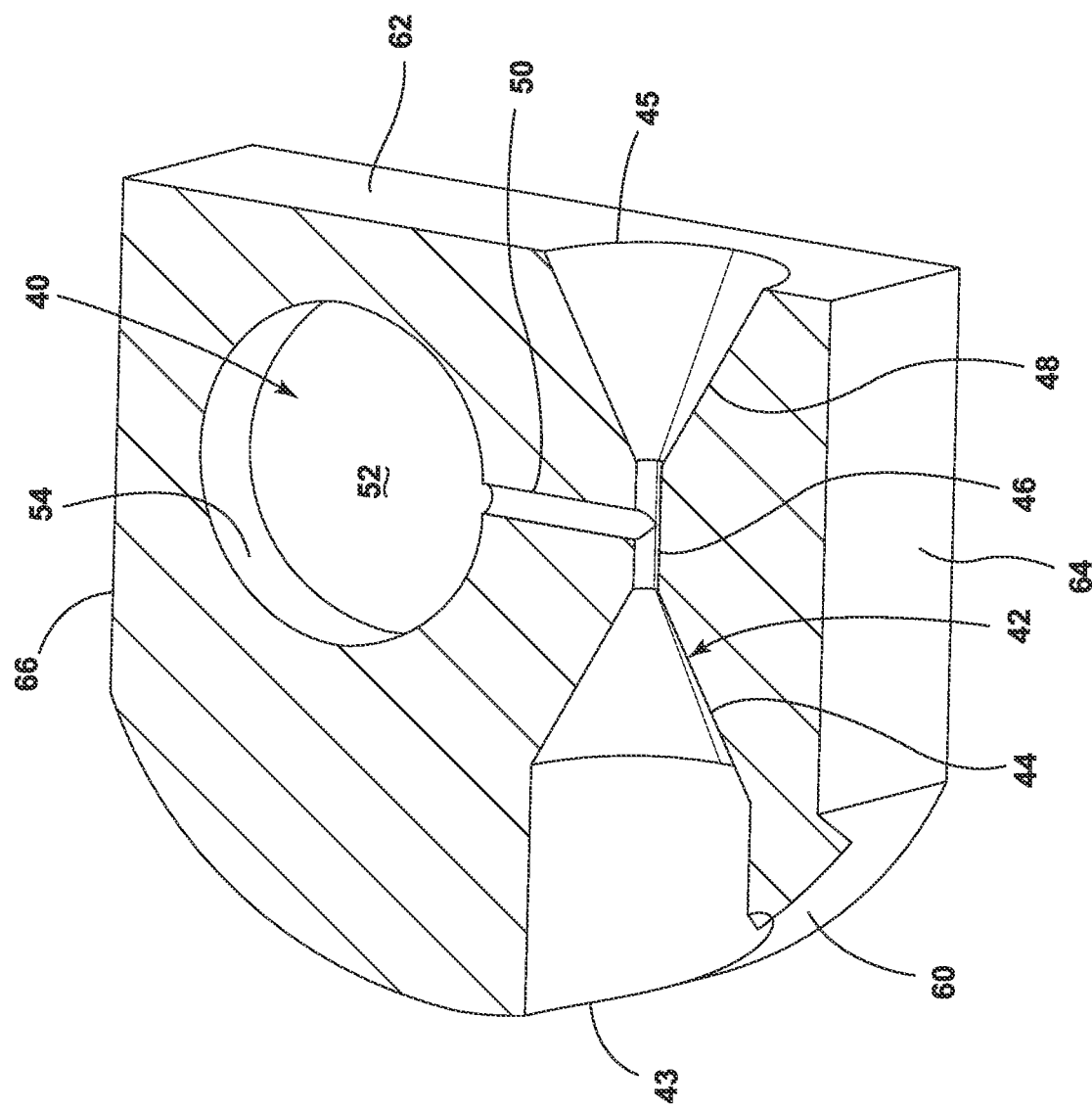
FIG. 5 is a horizontal cross-sectional view of the fuel trace collector of FIG. 4, illustrating a cavity (drain hole) and a venturi.

Operation of the fuel vapor storage canister and integral fuel trap will now be described in connection with an EVAP system, for example the EVAP system of FIG. 1. Fuel vapor including a small amount of liquid fuel trace is vented from the fuel tank 110 and flows through the fuel vapor line 104. The fuel vapor, including the liquid fuel trace, enters the liquid fuel trap 14, and in particular the first chamber 20, via the tank port 24. Fuel vapor bypasses the baffle 32 and passes into the adjacent adsorbent chamber 12 via the flow distributor 16, where it is adsorbed by the activated carbon bed. The liquid fuel trace is blocked by the baffle 32 (or series of baffles) and is prevented from entering the adsorbent chamber 12. In particular, the liquid fuel trace collects on the concave surface 34 of the baffle and flows into the opening 28 by gravity and/or deflects directly into the opening 28 as depicted in FIG. 4. The opening 28 can be surrounded by a sloped surface for funneling liquid fuel trace into the second chamber 22. The liquid fuel trace is then received within the cavity 40 in the fuel trace collector 30. The cavity 40 can include an activated carbon billet 56 to adsorb the liquid fuel trace and to maintain a minimum pressure at the tank port 24. The liquid fuel trace remains in the cavity 40 until purged.

When the purge valve 112 is OFF, the purge valve 112 is closed so that no vapors from the adsorbent chamber 12 enter the engine. At a designated time, a powertrain control module (PCM) duty cycles the purge valve 112. When the purge valve is ON, fuel vapor is desorbed from the adsorbent chamber 12 and fuel trace within the cavity 40 is drawn by a high suction pressure from the second chamber 22. The fuel vapor and fuel trace flows through the purge line 108 to the engine 114, where it is combusted. The engine's suction pressure also causes air from the atmosphere to be drawn into the canister 10 via an air inlet port, displacing the fuel vapor stored in the adsorbent chamber 12. With the purge cycle complete, the purge valve 112 is OFF and additional fuel vapor from the fuel tank 110 is allowed to flow into the canister 10.

As noted above, pressure pulsations caused by actuation of the purge valve 112 travel along the purge line 108 to the fuel vapor storage canister 10. To suppress these purge line pulsations, the second chamber 22 includes a larger cross-sectional area than the purge port 26, such that the second chamber 22 is functionally an expansion volume. As pulsations enter the expansion volume, the amplitude of the pulsations is greatly attenuated, thereby limiting the vibrations and acoustic rattle during purging cycles. The pulsations are further attenuated by passing through the venturi passages, carbon billet 56 or its associated cavity in the fuel trace collector. As the pulsations enter the first chamber 20 via the opening 28, they are again attenuated by a further expansion volume, in that the cross-sectional area of the first chamber 20 is significantly greater than the cross-sectional area of the opening 28. As the pulsations depart the fuel trap 14 via the tank port 24, they are greatly attenuated by virtue of having passed two expansion chambers: the second (lower) chamber 22, the first (upper) chamber 20, and the fuel trace collector 30. As a consequence, the chambers 20, 22 and the fuel trace collector 30 can be optimally designed to cater to the noise characteristics of the fuel vapor storage canister 10 and not depend on external noise reduction devices, which can be neither suitable nor optimal by design.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of any claims to the specific elements illustrated or described in connection with this embodiment. Any reference to elements in the singular, for example, using the articles "a," "an," "the," or "said," is not to be construed as limiting the element to the singular. Also, the terminologies "upper," "lower", "above", "below", etc. are intended for clarity of information while describing the embodiments as shown in the figures and are not to be construed as limiting the relationships between the geometric features of this invention.

The invention claimed is:

1. A fuel vapor storage canister comprising:
an adsorbent chamber including a fuel vapor adsorbent material contained therein; and
a fuel trap adjacent to the adsorbent chamber and including a partition dividing the fuel trap into an upper chamber and a lower chamber, the partition defining a partition opening therethrough such that the lower chamber is in fluid communication with the upper chamber through the partition opening;
wherein the upper chamber includes a baffle extending upwardly from the partition to obstruct liquid fuel trace that is entrained in fuel vapor entering the upper chamber via a tank port;
wherein the lower chamber includes a fuel trace collector, the fuel trace collector including an internal cavity disposed beneath the partition opening to collect the liquid fuel trace, the internal cavity containing activated carbon therein;
wherein the fuel trace collector further includes a venturi for drawing liquid fuel from the internal cavity, such that the liquid fuel within the internal cavity is drawn therefrom during purging of the adsorbent chamber and is evacuated from the lower chamber via a purge port, and
wherein the tank port, the purge port, the partition opening, the venturi, and the internal cavity containing the activated carbon each define a cross-sectional area that is less than a cross-sectional area of the upper chamber and the lower chamber, such that the upper chamber and the lower chamber together with the fuel trace collector comprise a noise attenuation system.

2. The fuel vapor storage canister of claim 1 further including a flow distributor separating the adsorbent chamber from the upper chamber of the fuel trap.

3. The fuel vapor storage canister of claim 2 wherein the baffle is positioned between the tank port and the flow distributor.

4. The fuel vapor storage canister of claim 1 wherein the baffle includes an annular sidewall that at least partially encircles the partition opening.

5. The fuel vapor storage canister of claim 1 wherein the baffle includes a concave surface opposite a convex surface.

6. The fuel vapor storage canister of claim 1 wherein the fuel trace collector further defines a flow passage interconnecting the internal cavity and the venturi.

7. The fuel vapor storage canister of claim 1 wherein the venturi includes a converging portion, an intermediate portion, and a diverging portion, the intermediate portion being open to the internal cavity for creating a suction pressure therein during purging of the adsorbent chamber.

8. The fuel vapor storage canister of claim 1 wherein the venturi and the purge port are laterally offset from the partition opening and the tank port.

9. The fuel vapor storage canister of claim 1 wherein the fuel trace collector defines a width less than a width of the lower chamber, such that fuel vapor can bypass the fuel trace collector on either side thereof during purging of the adsorbent chamber.

10. The fuel vapor storage canister of claim 1 wherein:
the fuel trace collector includes first and second side walls that interconnect a first end wall and a second end wall; and
the first end wall faces the adsorbent chamber and includes a contoured surface that slopes rearwardly toward the first side wall and the second side wall.

11. The fuel vapor storage canister of claim 1 further including activated carbon within the internal cavity of the fuel trace collector.

12. A liquid fuel trap comprising:
a tank port and a purge port;
an upper chamber open to the tank port and including a baffle therein, the baffle extending upwardly from a base of the upper chamber for obstructing liquid fuel trace that is entrained in fuel vapor entering the upper chamber via the tank port; and
a lower chamber in fluid communication with the upper chamber through a partition opening in the base of the upper chamber, the lower chamber including a fuel trace collector therein, the fuel trace collector defining an internal cavity for the collection of the liquid fuel trace, the fuel trace collector further defining a venturi for drawing the liquid fuel trace from the internal cavity for discharge via the purge port, the internal cavity containing activated carbon therein;
wherein the tank port, the purge port, the partition opening, the venturi, and the internal cavity containing the activated carbon each define a cross-sectional area that is less than a cross-sectional area of the upper chamber and the lower chamber, such that the upper chamber and the lower chamber together with the venturi and the internal cavity of the fuel trace collector comprise a noise attenuation system.

13. The liquid fuel trap of claim 12 wherein the baffle includes an annular sidewall that at least partially encircles the partition opening in the base of the upper chamber.

14. The liquid fuel trap of claim 12 wherein the baffle includes a concave surface opposite a convex surface.

15. The liquid fuel trap of claim 12 wherein the venturi includes a converging portion, an intermediate portion, and a diverging portion, the intermediate portion being open to the internal cavity for creating suction pressure therein during purging of an adjacent adsorbent chamber.

16. The liquid fuel trap of claim 12 wherein the venturi and the purge port are laterally offset from the baffle and the tank port.

17. The liquid fuel trap of claim 12 wherein the activated carbon includes an activated carbon billet, carbon granules, or carbon sheets.

* * * * *